Dec. 20, 1949     E. E. BROOME     2,491,849
SPACE HEATER

Filed May 25, 1948     2 Sheets-Sheet 1

INVENTOR.
Elmer E. Broome
BY Victor J. Evans & Co.
ATTORNEYS

Dec. 20, 1949     E. E. BROOME     2,491,849
SPACE HEATER

Filed May 25, 1948     2 Sheets-Sheet 2

INVENTOR.
Elmer E. Broome
BY Victor J. Evans & Co.
ATTORNEYS

Patented Dec. 20, 1949

2,491,849

UNITED STATES PATENT OFFICE 2,491,849

SPACE HEATER

Elmer E. Broome, Chattanooga, Tenn.

Application May 25, 1948, Serial No. 29,122

1 Claim. (Cl. 219—39)

This invention relates to heating apparatus.

It is an object of the present invention to provide a compact heating apparatus particularly adapted for use with electric current and wherein the water is fed by a pump to a large vessel centrally located within the apparatus and is extended from the vessel through a plurality of coils located in sections at different locations within the apparatus and returned to the pump, adequate means being provided to supply the system with any loss of water and wherein there is forced through the apparatus air which will pass to various outlet pipes in the top of the apparatus.

It is another object of the present invention to provide an electric heating furnace which is of simple construction, inexpensive to manufacture, and efficient in operation.

For other objects and for a better understanding of the invention, reference may be had to the following detailed description taken in connection with the accompanying drawing, in which.

Figure 1:
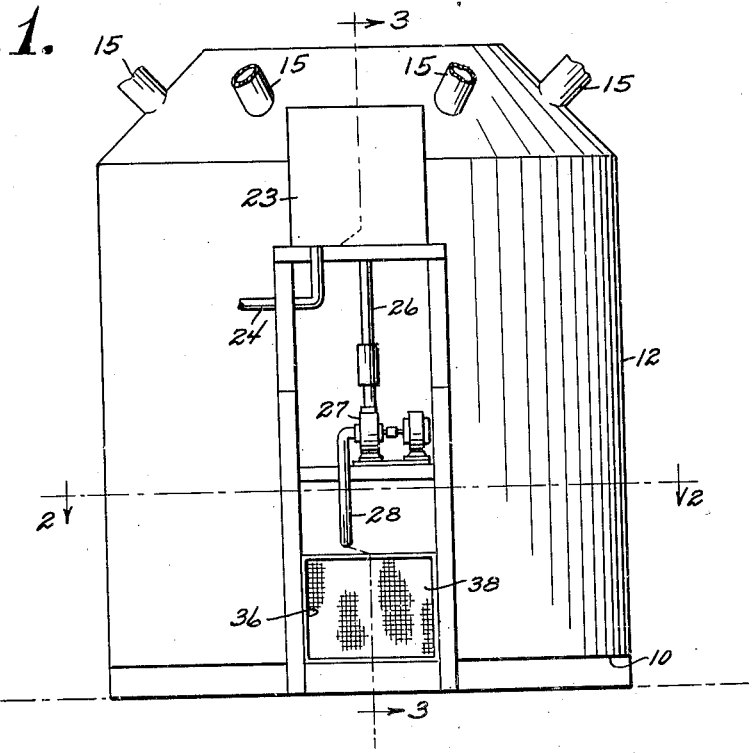
Fig. 1 is an elevational view of the heater embodying the features of the present invention.
Figure 2:
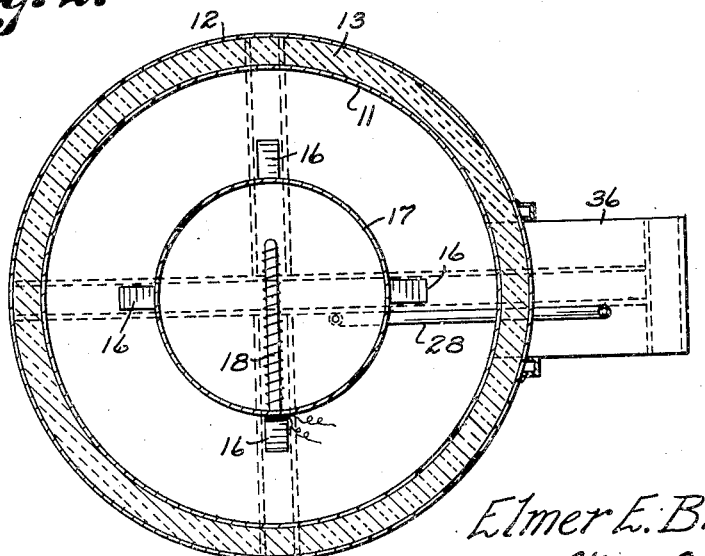
Fig. 2 is a transverse sectional view taken on line 2—2 of Fig. 1.
Figure 3:
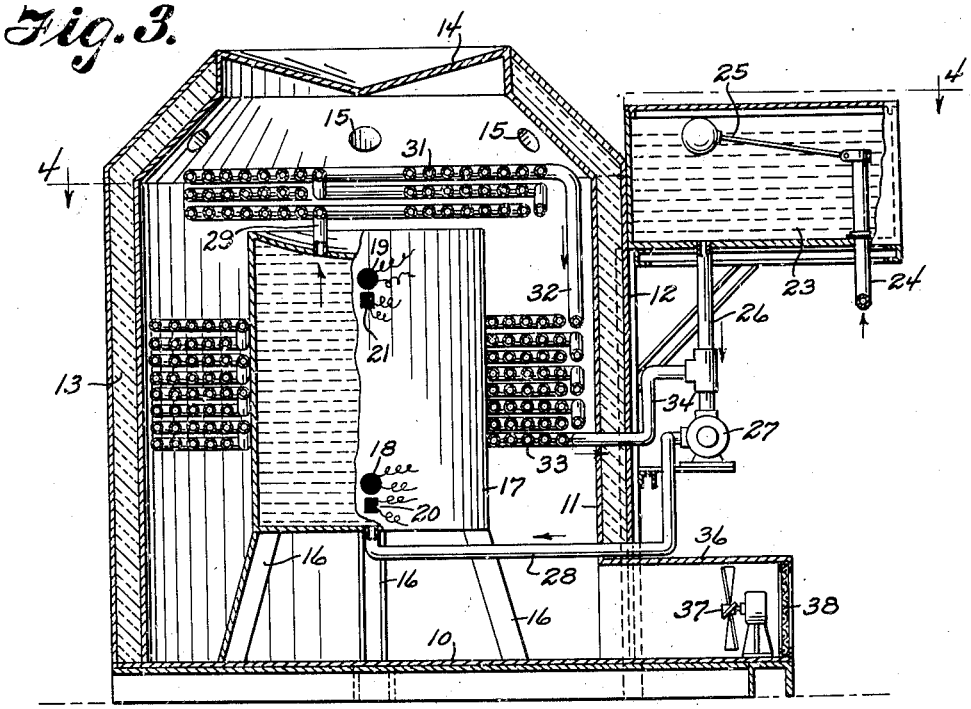
Fig. 3 is a sectional view, in elevation, taken on line 3—3 of Fig. 1.
Figure 4:
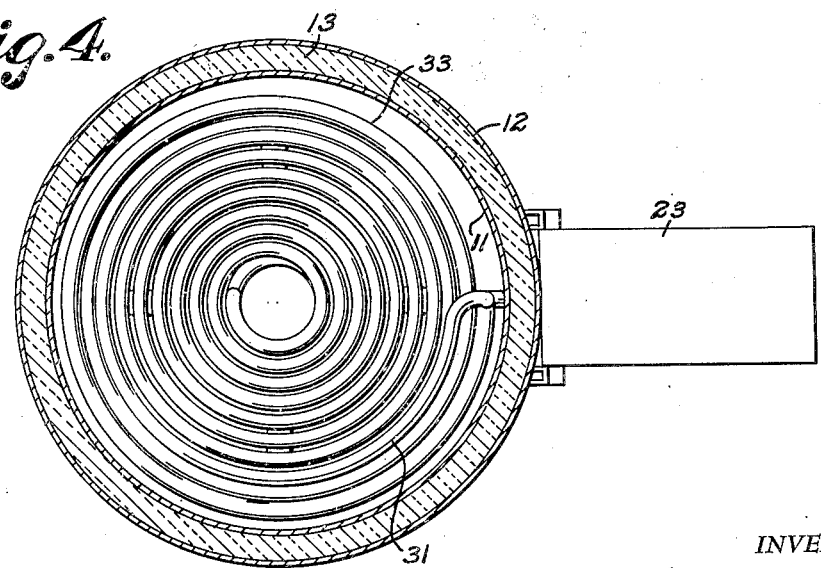
Fig. 4 is a transverse sectional view taken on line 4—4 of Fig. 3.

Referring now to the figures, 10 represents a bottom floor on which is mounted inner and outer casing walls 11 and 12 with insulation 13 therebetween. In the top of the furnace is a dished plate portion 14 for deflecting heat and below this portion the apparatus casing is of conical shape and hot air outlets extend outwardly and upwardly therefrom as indicated at 15. These outlets are circumferentially spaced about the tapered or conical top of the casing.

Within the casing and supported upon legs 16 is a large vessel 17 which is closed at the top and bottom and adapted to contain water to be heated. Extending into the vessel are electric heating units 18 and 19 and thermostats 20 and 21 located respectively adjacent the electric heating units. These electric heating units are sufficient to bring the water within the vessel 17 to a boiling point. Preferably the water is kept below the boiling point but close thereto.

On the top of the casing and at one side thereof is a water supply tank 23 having a water inlet pipe 24 and a float valve device 25 for controlling the inward flow of water to the supply tank 23. Water leaves the bottom of the tank through a pipe 26 and is caused to be circulated by a pump 27 and forced into the vessel 17 through a pipe 28.

At the top of the vessel 17 is an outlet 29 leading to a copper coil 31 which lies above the vessel 17. From this coil through a pipe portion 32 the water extends to a larger coil 33 which surrounds the vessel 17. The water returns to the pump 27 through pipe portion 34. The same water is continually used and is only replenished when necessary by water from the supply tank 23.

At the bottom of the case and adjacent to the floor 10 is an an air inlet 36 in which there is a circulating fan 37 and an air filtering device 38. Air is drawn inwardly and forced upwardly over the vessel and the hot water coils and outwardly through the several outlets 15.

Any vapor which is produced in the system will be extended up into the water supply tank 23 and be condensed and used over again.

While various changes may be made in the detail construction, it shall be understood that such changes shall be within the spirit and scope of the present invention as defined by the appended claim.

I claim:

A heating apparatus comprising a base, a casing resting upon the base, air outlets on the upper end of the casing, an air inlet at the lower part of the casing, a water vessel mounted within the casing and centrally thereof, heating coils connected to the water vessel, a water pump for circulating water through the vessel and heating coils and automatic water supply means extending to the pump, and electric heater means connected to the vessel to heat the water therewithin and said heating coils being in two sections, one section located above the vessel and the other section surrounding the exterior of the vessel and means for causing air to be forced into the apparatus through the inlet and over the vessel and the coils thereof, and thermostat means disposed within the vessel to control the temperature of the water therewithin.

ELMER E. BROOME.

REFERENCES CITED

The following references are of record in the file of this patent:

UNITED STATES PATENTS

| Number | Name | Date |
| --- | --- | --- |
| 623,348 | Allington | Apr. 18, 1899 |
| 1,678,059 | D'Ardenne | July 24, 1928 |
| 1,907,357 | Kovesdy | May 2, 1933 |
| 2,197,298 | Cobb | Apr. 16, 1940 |
| 2,438,834 | Wartes | Mar. 30, 1948 |